US012578893B2

(12) United States Patent
Udaya et al.

(10) Patent No.: US 12,578,893 B2
(45) Date of Patent: Mar. 17, 2026

(54) SYSTEMS AND METHODS FOR COPYING DATA BETWEEN COMPUTER SYSTEMS

(71) Applicant: SAP SE, Walldorf (DE)

(72) Inventors: Sahana Durgam Udaya, Bangalore (IN); Soumya Basavaraju, Bangalore (IN); Abhishek Nagendra, Bangalore (IN); Ashok Kumar KN, Bangalore (IN); Mickey Wong, Burnaby BC (CA)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 18/531,354

(22) Filed: Dec. 6, 2023

(65) Prior Publication Data

US 2025/0190131 A1    Jun. 12, 2025

(51) Int. Cl.
    *G06F 3/06*        (2006.01)
    *G06F 16/11*       (2019.01)
(52) U.S. Cl.
    CPC .......... *G06F 3/0647* (2013.01); *G06F 3/0604* (2013.01); *G06F 3/0683* (2013.01); *G06F 16/119* (2019.01)
(58) Field of Classification Search
    None
    See application file for complete search history.

(56) References Cited

U.S. PATENT DOCUMENTS

| | | | |
|---|---|---|---|
| 6,564,261 B1 | 5/2003 | Gudjonsson et al. | |
| 2002/0083124 A1 | 6/2002 | Knox et al. | |

| | | | |
|---|---|---|---|
| 2005/0203887 A1 | 9/2005 | Joshi et al. | |
| 2007/0156633 A1 | 7/2007 | Sugita | |
| 2009/0037373 A1 | 2/2009 | Gilbert | |
| 2009/0254572 A1 | 10/2009 | Redlich et al. | |
| 2010/0250497 A1 | 9/2010 | Redlich et al. | |
| 2012/0030167 A1 | 2/2012 | Appiah | |
| 2012/0185448 A1 | 7/2012 | Mensch et al. | |
| 2013/0139241 A1 | 5/2013 | Leeder | |
| 2013/0159062 A1 | 6/2013 | Stiehl | |
| 2013/0191519 A1 | 7/2013 | Chang et al. | |
| 2013/0262392 A1 | 10/2013 | Vibhor et al. | |
| 2014/0359576 A1 | 12/2014 | Rath et al. | |

(Continued)

FOREIGN PATENT DOCUMENTS

| | | |
|---|---|---|
| CN | 115063026 A | 9/2022 |
| GB | 2375006 A1 | 10/2002 |
| JP | 2008-084182 A2 | 4/2008 |
| JP | 4444518 B2 | 3/2010 |

OTHER PUBLICATIONS

The extended European search report of Application No. 24210027.9 dated May 12, 2025. 13 pages.

(Continued)

*Primary Examiner* — Thu N Nguyen
(74) *Attorney, Agent, or Firm* — Fountainhead Law Group, PC

(57) ABSTRACT

Embodiments of the present disclosure include techniques for copying data between computer systems. In one embodiment, a content management system stores a hierarchy of objects. A backend server may receive information about the hierarchy of objects. A dependencies may be generated to define links between the objects in the hierarchy. A copy of the hierarchy of objects may be created on a backend system. In some embodiments, the copy may have a unique set of object IDs.

14 Claims, 5 Drawing Sheets

(56) References Cited

U.S. PATENT DOCUMENTS

| | | | |
|---|---|---|---|
| 2015/0074286 A1 | 3/2015 | Anschutz | |
| 2015/0120649 A1* | 4/2015 | Nakadai | G06F 3/0644 |
| | | | 707/609 |
| 2015/0236907 A1 | 8/2015 | Popli | |
| 2016/0110828 A1 | 4/2016 | Master et al. | |
| 2017/0195373 A1 | 7/2017 | Toh et al. | |
| 2018/0081905 A1* | 3/2018 | Kamath | G06F 16/287 |
| 2019/0303445 A1 | 10/2019 | Padmanabhan | |
| 2020/0092177 A1 | 3/2020 | Marvin et al. | |
| 2020/0118330 A1* | 4/2020 | Connelly | G06F 30/13 |
| 2020/0242481 A1 | 7/2020 | Kim et al. | |
| 2021/0058447 A1 | 2/2021 | Trufasiu et al. | |
| 2021/0109862 A1* | 4/2021 | Yang | G06F 13/1668 |
| 2021/0134407 A1 | 5/2021 | Vera-Ciro et al. | |
| 2021/0168128 A1 | 6/2021 | Carru et al. | |
| 2021/0385252 A1 | 12/2021 | Lebin et al. | |
| 2021/0399877 A1* | 12/2021 | Ohashi | H04L 9/3239 |
| 2021/0406397 A1 | 12/2021 | Brazeau et al. | |
| 2022/0027509 A1 | 1/2022 | Amico | |
| 2022/0076240 A1 | 3/2022 | Ghani et al. | |
| 2022/0245290 A1 | 8/2022 | Luciani | |
| 2023/0007483 A1 | 1/2023 | Mueck et al. | |
| 2023/0098596 A1 | 3/2023 | Karri et al. | |
| 2024/0069234 A1 | 2/2024 | Meenakshi Sundaram Gandhi et al. | |
| 2024/0333822 A1 | 10/2024 | Parla et al. | |
| 2024/0419456 A1 | 12/2024 | Eberlein | |

OTHER PUBLICATIONS

Bigstar: "Site to site transfers (FXP)—1-15 INV. Flash FXP Forums", H04L9/40, Apr. 22, 2014 (Apr. 22, 2014), pp. 1-2, XP093246533, The Way back machine Retrieved from the Internet: URL: https://web.archive.org/web/20140718041834/https://www.flashfxp.com/forum/flashf xp/frequently-asked-questions-faq-/14656-site-site-transfers-fxp.html [retrieved on Feb. 4, 2025].

Cppcis231: "How to FTP and FXP", 1-15, Mar. 5, 2012 (Mar. 5, 2012), XP093246544, Retrieved from the Internet: URL:https://www.youtube.com/watch?v=6XXQge RWWRw [retrieved on Feb. 4, 2025].

The extended European search report of Application No. 24206608.2 dated Mar. 10, 2025. 6 pages.

Stefan Momma, Enterprise Content Management for SAP, Redbook,50 pages, Sep. 15, 2015. (Year: 2015).

* cited by examiner

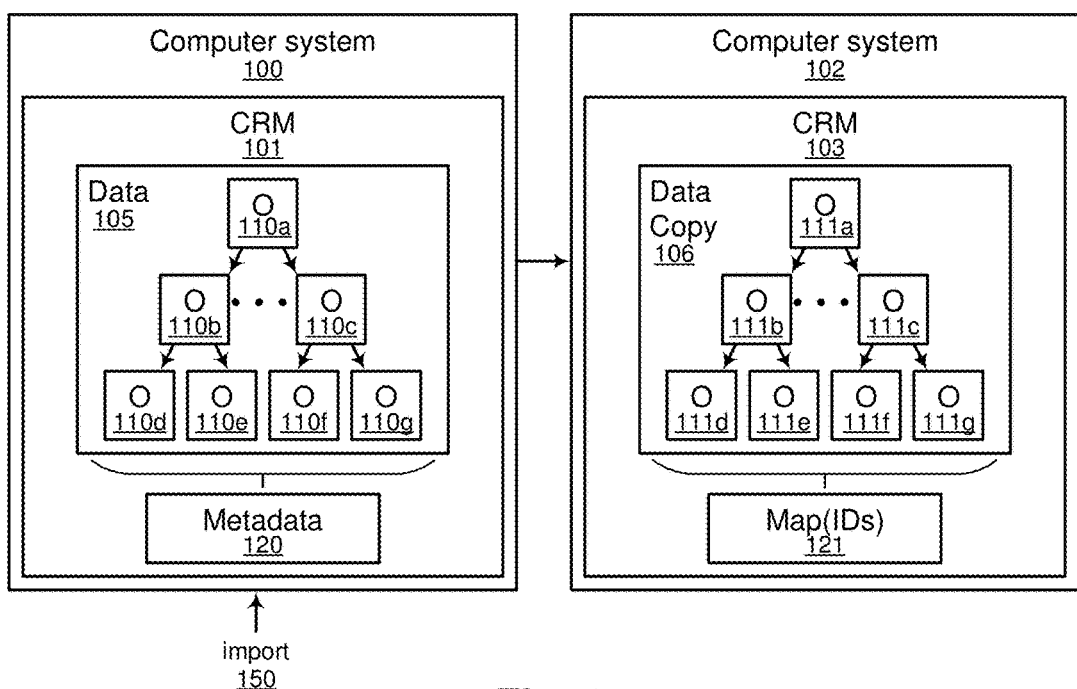

*Fig. 1*

| | 201 |
|---|---|
| storing data in a first computer system, the data comprising a hierarchy of linked objects | |

| | 202 |
|---|---|
| receiving an input triggering an import of the data from a first computer system to a second computer system | |

| | 203 |
|---|---|
| iterating through the data to produce a dependencies map, on the second computer system, specifying the hierarchy of linked objects | |

| | 204 |
|---|---|
| copying the data from the first computer system to the second computer system | |

| | 205 |
|---|---|
| unique copy of hierarchy of linked objects is recreated on the second computer system using the dependencies map | |

*Fig. 2*

Tenant Frontend
301

User →

Content Management System
302

Content Manager Service ⟍ 310

Content Manager DB Server ⟍ 311

Backend Application Server 303

Data 304

Object datastore

Database

Package Metadata info: Version etc.,
objects: [ Object 1,
         Object 2,
         ·        320
         ·
         ·
         Object N]

| Object 1 | Object 2 | | Object N |
|---|---|---|---|
| Object Metadata 321a | Object Metadata 321b | ... | Object Metadata 321n |

Fig. 3B

```
{
  "info": {
    /* Package version information */
  },
  "objects": [
    {
      "objectType": "RESOURCE",
      "objectName": "Annual Reports",
      "objectId": "objectIdA",
      "parentResId": "PUBLIC",
      "ancestorPath": [ ]
    },                                    321x
    {
      "objectType": "RESOURCE",
      "objectName": "New Story",
      "objectId": "objectIdC",
      "parentResId": "objectIdB",
      "ancestorPath": [ ]
    },
    {
      "objectType": "RESOURCE",
      "objectName": "Finance Reports",
      "objectId": "objectIdB",
      "parentResId": "objectIdA",
      "ancestorPath": [ ]
    },
  ]
}
```

Fig. 3C

Create package 330 → Share package 331 → Import package 332

Fig. 3D

SYSTEMS AND METHODS FOR COPYING DATA BETWEEN COMPUTER SYSTEMS

CROSS REFERENCE TO RELATED APPLICATIONS

This application is related to, and concurrently filed with, U.S. patent application Ser. No. (Unassigned; entitled "SYSTEMS AND METHODS FOR PARALLEL TRANSPORT OF DATA BETWEEN COMPUTER SYSTEMS", naming Sahana Durgam Udaya and Suneel Sristi as inventors, filed on Dec. 6, 2023, the disclosure of which is hereby incorporated herein by reference.

This application is related to, and concurrently filed with, U.S. patent application Ser. No. (Unassigned; entitled "SYSTEMS AND METHODS FOR AUTHORIZED MOVEMENT OF INFORMATION BETWEEN COMPUTER SYSTEMS", naming Sahana Durgam Udaya as inventor, on Dec. 6, 2023, the disclosure of which is hereby incorporated herein by reference.

This application is related to, and concurrently filed with, U.S. patent application Ser. No. (Unassigned; entitled "SYSTEMS AND METHODS FOR SCHEDULING PACKAGES TO SYNCHRONIZE CONTENT ACROSS COMPUTER SYSTEMS", naming Sahana Durgam Udaya and Pranav Kumar as inventors, filed on Dec. 6, 2023, the disclosure of which is hereby incorporated herein by reference.

This application is related to, and concurrently filed with, U.S. patent application Ser. No. (Unassigned; entitled "SYSTEMS AND METHODS FOR STORING AND RETRIEVING PUBLIC DATA", naming Sahana Durgam Udaya as inventor, filed on Dec. 6, 2023, the disclosure of which is hereby incorporated herein by reference.

BACKGROUND

The present disclosure relates generally computer systems, and in particular, to systems and method for copying data between computer systems.

Computer systems require data to produce useful and meaningful results. Data preparation and analytics can involve complex, time consuming preparation of relations, visualizations, and compilations of data. When data is prepared in such a way, it may be beneficial to share the data across multiple computer systems. However, moving complex data structures across different systems can be a challenge. One particular challenge pertains to copying data between systems. For example, when a computer system creates a copy of data comprising multiple objects, it is possible for the versions of the objects to create a conflict. This is particularly the case for copying hierarchies of data objects with object dependencies.

The present disclosure addresses these and other challenges and is directed to techniques for copying data across many computer systems.

BRIEF DESCRIPTION OF THE DRAWINGS

FIG. 1 illustrates a system for copying data across computer systems according to an embodiment.

FIG. 2 illustrates a method of copying data across computer systems according to an embodiment.

FIG. 3A illustrates an example system according to another embodiment.

FIG. 3B illustrates an example package according to an embodiment.

FIG. 3C illustrates an example data object according to an embodiment.

FIG. 3D illustrates a transport process according to an embodiment.

DETAILED DESCRIPTION

Figure 4A:
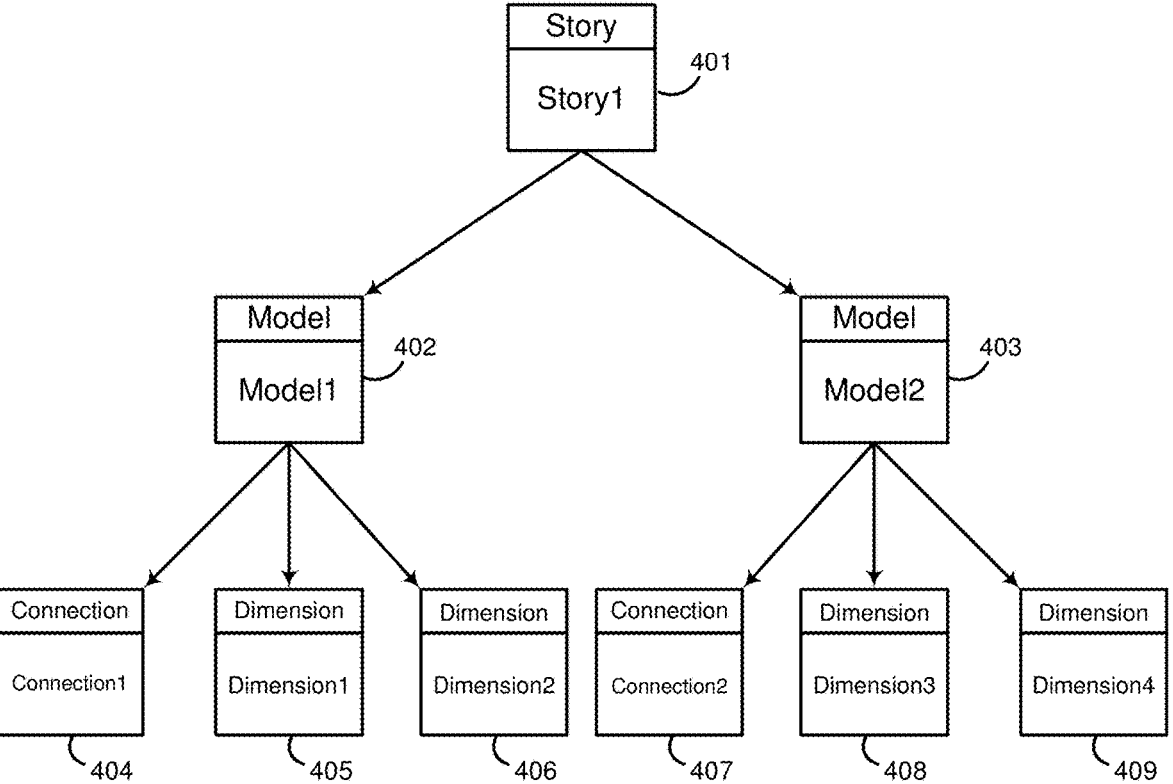
FIG. 4A illustrates an example object hierarchy according to an embodiment.

Described herein are techniques for storing and retrieving public data. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

FIG. 1 illustrates a system for copying data across computer systems 100 and 102 according to an embodiment. Features and advantages of the present disclosure include techniques for copying data between computer systems. The present techniques may be applied to a wide range of applications and the examples shown herein are merely illustrative. The present techniques may be applied to a wide range of software systems deployed on a variety of architecture. For example, in some embodiments, computer systems may include on-prem deployments of applications, cloud deployments of applications, or combinations thereof. Computers may execute software applications directly or the computers may execute virtual machines that, in turn, execute software applications (or combinations thereof). In various embodiments, computers may reside in the same location or be spread out across geographic regions.

Computer systems 100 and 102 may represent numerous computers executing multiple software modules. In some embodiments, a user may interface with various backend applications through a frontend application of a software application, and the frontend may interface with a backend application. For example, user interaction with functionality of a backend application may be through the frontend, which may provide a user interface (e.g., a browser-based user interface). Backend applications may include software logic for performing a wide range of functions specific to the particular application and may further include a database system (not shown) for storing application data. Example backend applications include the Concur® software application and the Successfactors® software application by SAP®. Backend applications may support numerous frontends. A particular backend application may be deployed on multiple computer servers (e.g., backend application servers) to provide compute resources for potentially many users.

FIG. 1 shows computer systems 100 and 102. It may be desirable to copy data 105 in computer system 100 to computer system 102. In some embodiments, computer system 100 is a content management system and computer system 102 is a backend server application, for example. Data 105 may be stored in a non-transitory computer readable medium (CRM) 101, such as a memory, for example. Data 105 may comprise hierarchy of linked objects 110*a-g*, where parent objects on one level of the hierarchy are linked to dependent child objects on a lower level of the hierarchy.

In this illustrative example, object 110*a* is top level object of the hierarchy, objects 110*b-c* are second level objects of the hierarchy, and objects 110*d-g* are third level objects of the hierarchy. In some example embodiments described below, the top level object of the hierarchy is a data visualization object, the second level objects of the hierarchy are predefined data cubes objects linked to the data visualization object, and the third level objects of the hierarchy are dimensions objects linked to the data cube objects. However, the present techniques may be applied to a variety of different object types.

Copying data may start when computer system 100 receives an input 150 triggering an import of the data from computer system 100 to computer system 102. In some embodiments, after receiving the input 150, computer system 100 may access a portion of metadata 120 for the hierarchy of linked objects. The portion of metadata 120 may specify object identifications and dependencies between the linked objects, for example. Next, computer system 100 may send the data 105 and the accessed portion of metadata 120 to computer system 102. Computer system 102 may iterate through the data to produce a dependencies map 121, which may specify the hierarchy of linked objects. For example, the dependencies map 121 may specify links between the objects, for example. Additionally, computer system 102 may generate a list of new object identifications for the hierarchy of linked objects (e.g., an identification map) before the data is copied. In some embodiments, the dependencies map 121 is sorted prior to performing a copy so that dependent child objects are copied to computer system 102 before parent objects in the hierarchy, for example. Next, data 105 is copied from computer system 100 to computer system 102. As a result of the copy operation, a unique copy 106 of the hierarchy of linked objects 111*a-g* is recreated and stored in a non-transitory computer readable medium (CRM) 103 on computer system 102 using the dependencies map 121. In some embodiments, objects 111*a-g* may be assigned new object identifications unique to computer system 102, for example. More detailed examples illustrating the techniques described herein are provided below.

FIG. 2 illustrates a method of copying data between computer systems according to an embodiment. At 201, data is stored in a first computer system, the data comprising a hierarchy of linked objects. At 202, an input is received triggering an import of the data from a first computer system to a second computer system. At 203, the second computer system iterates through the data to produce a dependencies map specifying the hierarchy of linked objects. At 204, the data is copied from the first computer system to the second computer system. At 205, a unique copy of the hierarchy of linked objects is recreated on the second computer system using the dependencies map. As mentioned above, the copy may comprise objects with new unique IDs.

FIG. 3A illustrates an example database system according to another embodiment. In this example, a user accesses a content management system 302 and backend application running on a server 303 over a tenant frontend 301. Content management system (CMS) 302 includes a content manager service 310, content manager database (DB) server 311, object datastore 312, and database 313.

The present disclosure may be used in the context of an analytics content network in a cloud computer system that combines business intelligence (BI) and planning and predictive capabilities, for example. In any business intelligence application, the analytics content (model, story, visualizations, etc.) plays the central role in discovering the unseen patterns to boost the business productivity. Hence sharing of the analytics content across users is very helpful for better collaboration. Also, a standard content template can be reused by all user by plugging their corresponding data. An infrastructure for sharing the analytics content is sometimes referred to as an "Analytical Content Network" (ACN). The content entity that contains content on a CMS is called "package."

ACN may be arranged landscapes as a central component, all of which are connected. An application landscape is a coherent set of interconnected applications often within an enterprise, business, or organization, which are often associated with different geographical regions, for example. Logically ACN is "one global content network" which can provision or share any content with servers and users across landscapes. ACN may supports the following end-user workflows. A content creator creates content in the form of stories, models, dimensions, connections, Value-Driver Trees (VDT), etc. If authorized, the user can then export this content from a tenant (a portion of system resources securely assigned to a particular group) to ACN by creating a "content package," which can contain any number of these content items and share this with multiple other tenants, for example. Another SAC Content user can view all available content packages in their listing and import those packages relevant for their analytic workflows. This includes public content (Templates or Demo content) and private content (shared privately with them). To achieve sharing across tenants, the content is bundled in what is referred to as a "content package" (or just, package). A package may contain the details of each object present in the package, the dependency information between those objects, and an overview which summarizes the content details, for example. Data objects are stored in datastore 312 and data describing the data objects and packages (object metadata) may be stored in database 313, for example. An example package is shown in FIG. 3B comprising package metadata 320, and data objects 321*a-n*, which include object metadata, for example. An example data object 321*x* is shown in FIG. 3C, which may contain a list of objects and dependencies.

Embodiments of the present disclosure may include three steps for transportation of data content and objects across tenants as shown in FIG. 3D. At 330, a source creates a package, at 331, the source shares the package to a destination, and at 332, the target imports the package.

FIG. 4A illustrates an example object hierarchy according to an embodiment. As mentioned above, embodiments of the disclosure are particularly advantageous for copying analytic content. In this example, a top level object in the hierarchy is a story object 401. A story object may comprise one or more data visualizations of underlying data, such as charts, graphs, tables, or the like. Story1 is an instance of a story object comprising particular data visualizations. Story1 is linked to two second level model objects 402 and 403, which are children of the story object 401. Model objects may comprise data models. A data model specifies the way data is organized, documented, and/or defined (e.g., within a datastore). A data model may determine the structure of data, for example. One example data model is a data cube. A data cube may be predefined and used to feed data to the story object for visualization in a user interface, for example. Model1 is an instance of a model object, and model2 is another instance of a model object. Model object 402 is a parent object to multiple third level hierarchy objects; here, connection object 404 and dimension objects 405-406. Connection1 is an instance of a connection object, which provides a way to access data from remote systems.

Dimension 1 405 and dimension2 406 are instances of a dimension object, which are data objects that represent categorical data in a dataset; for example, Products or Sales. Similarly, Model object 403 is a parent object to multiple third level hierarchy objects; here, connection object 407 and dimension objects 408-409. Connection2 is an instance of the connection object, and dimension3 408 and dimension4 409 are instances of the dimension object.

Features and advantages of some embodiments may include recreating a hierarchy of data objects and assigning a new set of object IDs to some or all of the objects. This may advantageously allow a user to work on a copy of a hierarchy of objects on a backend application without impacting other instances of objects on the backend application. For example, a story object may reference second level objects using the ID. IDs may be used to establish the links in the hierarchy. To perform a copy, the system may use the old IDs to create new IDs for the objects. Objects in a hierarchy may be determined on the CMS. An ID map may be created on the backend server from IDs received from the CMS (old IDs) so that objects are created with new IDs rather than IDs from the content manager. The backend may map old IDs from the CMS to new IDs to be used for the copy. In some embodiments, application program interfaces (APIs) provided by the backend are used to create objects on backend using the ID map as an input to create objects with new IDs for the copy of the hierarchy of data objects, for example.

Figure 4B:
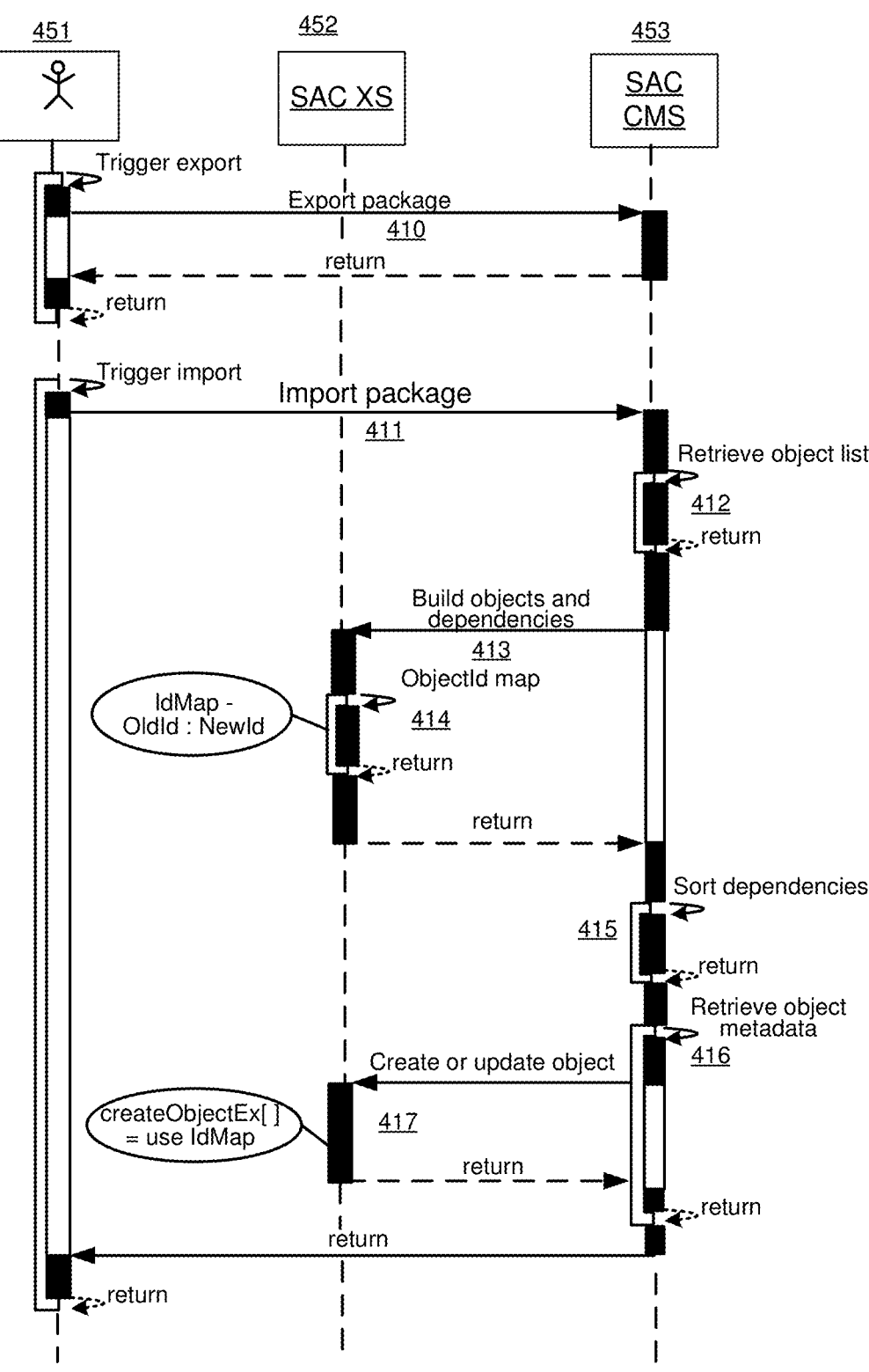
FIG. 4B illustrates an example of copying objects according to an embodiment.

FIG. 4B illustrates an example of copying objects according to an embodiment. In this example, a user of a frontend system 451 triggers an export of data at 410, and a hierarchy of linked objects are moved from a backend application (SAC XS) 452 and stored in SAC CMS 453. In some embodiments, a top level object of the hierarchy is a data visualization object, second level objects of the hierarchy are predefined data cubes objects, and third level objects of the hierarchy are dimensions objects and connection objects. At 411, frontend 451 sends an input to CMS 453 to trigger an import of the hierarchy of objects stored in the CMS to backend application 452. At 412, a list of objects in the hierarchy of objects and information about the objects is retrieved. For example, CMS 453 may retrieve a list of object identifications associated with the hierarchy of linked objects, where the object identifications link objects in the hierarchy and establish dependencies between the objects. In some embodiments, CMS 453 may access a portion of the object metadata in a package on the CMS sufficient to determine IDs for the objects in the hierarchy and dependencies between the objects (e.g., but not sufficient to recreate objects and hierarchy as illustrated below). At 413, CMS 413 sends information about the objects to be build (copied) and dependencies between them to backend application 452. For example, a portion of the metadata and a list of object identifications may be sent from CMS 453 to backend application 452. At 414, backend server 452 receives the information about the object hierarchy (e.g., including old object IDs) and builds an ID map of objects and dependencies. In some embodiments, the backend application 452 may iterate through the received information to produce an identification (ID) map linking old object identifications with new object identifications for the hierarchy of linked objects. The ID map may associate an old ID with a new ID for each object in the hierarchy. The ID map may further associate resources. An example ID map is as follows:

```
oOptions.idMap = {
        resource: {
                <old resource ID>: <new resource ID>
        },
        empObject: {
                <old EMP object ID>: <new EMP object ID>
        }
}
```

The ID map stores the old ID of the object coming from a package and new ID of an object created on target tenant. In some embodiments, the ID map specifies a resource (e.g., which are objects available on a files section) and other objects like connections, dimensions, etc., that are not part of this files section. In some embodiments, CMS 413 may access APIs configured to perform steps 413 and 414, for example.

At 415, CMS 453 sorts the hierarchy of objects based on the dependencies. Accordingly, copying may be based on the sorted dependencies so that dependent child objects are copied to the backend before parent objects in the hierarchy. At 416, metadata for the hierarchy of linked objects is retrieved. At 417, CMS 453 may create a copy of the hierarchy of linked objects on the backend 452 using the metadata and the ID map. The ID map may be used so that the objects in the hierarchy have new IDs. In some embodiments, CMS 453 may access API on backend 452 to create a copy of the hierarchy of objects, assign new IDs to each object in the hierarchy using the ID map, and load all the metadata associated with the hierarchy of objects on CMS 453 into the copy of the hierarchy of objects on backend 452.

Another advantage of the present techniques is that users may create multiple copies of content in the same system/ tenant. Multiple users can import same content into their respective user folders which would create multiple copies of the same content on same tenant.

Figure 5:
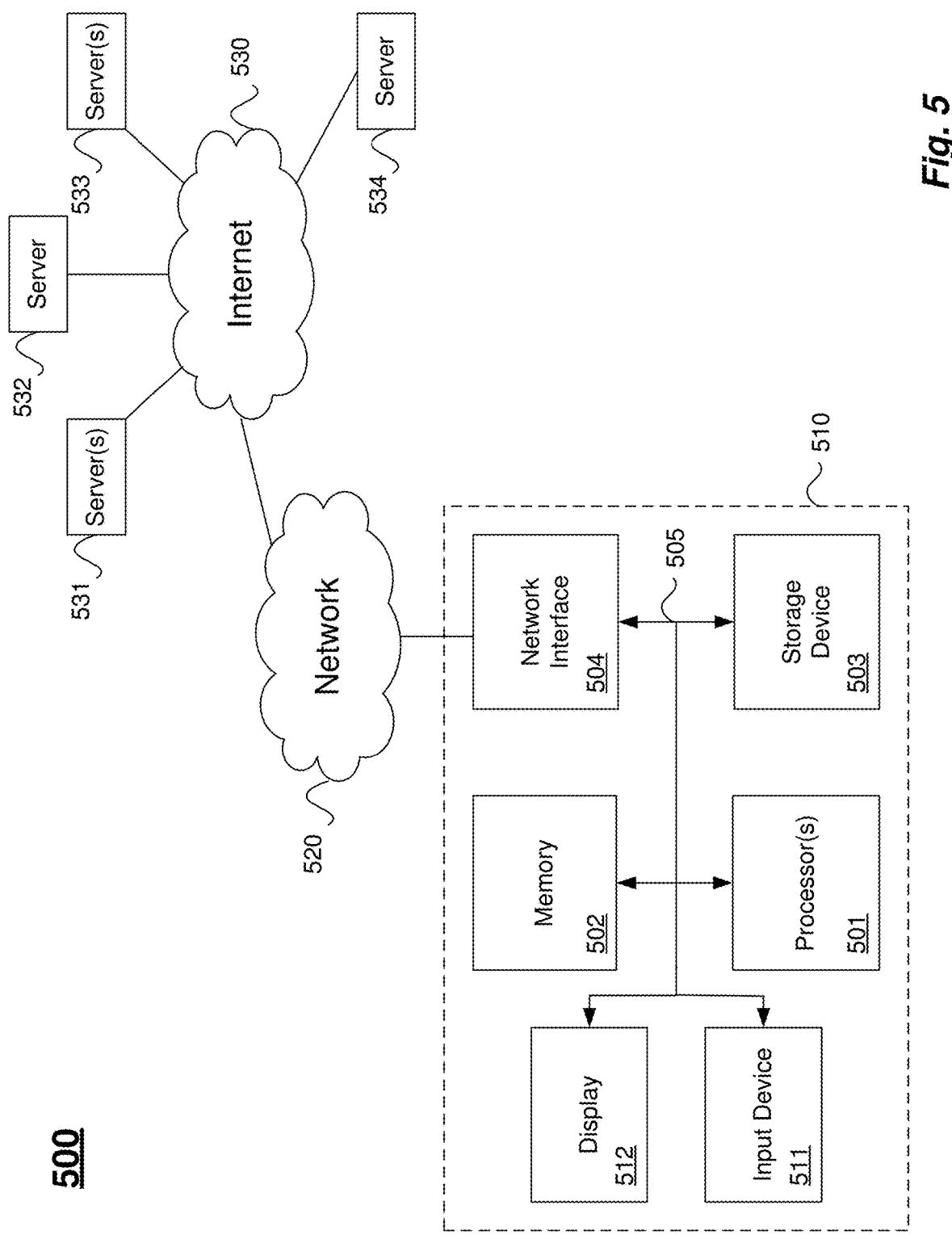
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of copying data between computer systems comprising: storing data in a first computer system, the data comprising a hierarchy of linked objects; receiving an input triggering an import of the data from a first computer system to a second computer system; iterating, by the second computer system, through the data to produce a dependencies map, on the second computer system, specifying the hierarchy of linked objects; and copying the data from the first computer system to the second computer system, wherein a unique copy of the hierarchy of linked objects is recreated on the second computer system using the dependencies map.

In some embodiments, the input triggering the import is received in the first computer system, the method further comprising: after receiving the input, accessing a portion of metadata for the hierarchy of linked objects by the first computer system, the portion of metadata specifying object identifications and dependencies between the linked objects; and sending the portion of metadata to the second computer system.

In some embodiments, the first computer system is a content management system and the second computer system is a backend server application.

In some embodiments, the method further comprising sorting the dependencies map, wherein said copying is based on the sorted dependencies map so that dependent child objects are copied to the second computer system before parent objects in the hierarchy.

In some embodiments, the method further comprising generating, by the second computer system, a list of new object identifications for the hierarchy of linked objects before the data is copied.

In some embodiments, the dependencies map comprises an identification map linking old object identifications with new object identifications for the hierarchy of linked objects.

In some embodiments, the identification map links a story comprising a plurality of data visualizations with a plurality of data models, and further links each data model of the plurality of data models to a plurality of dimensions.

In some embodiments, the plurality of data models is a plurality of predefined data cubes.

In some embodiments, the second computer system comprises a plurality of old versions of one or more objects of the plurality of objects having first object identifications, and wherein, in response to said copying the data, the second computer system creates new objects with new object identifications based on the identification map.

In some embodiments, the first computer system accesses the second computer system using application programming interfaces.

In some embodiments, the present disclosure includes a method of copying data from a content management system to a backend server application, the method comprising: storing data in a content management system, the data comprising a hierarchy of linked objects, wherein a top level object of the hierarchy is a data visualization object, second level objects of the hierarchy are predefined data cubes objects, and third level objects of the hierarchy are dimensions objects; receiving, in the content management system, an input triggering an import of the data from a content management system to a backend server application; retrieving, by the content management system, a list of object identifications associated with the hierarchy of linked objects, wherein the object identifications link objects in the hierarchy; sending the data and a list of object identifications to the backend server application; iterating, by the backend server application, through the data to produce an identification map linking old object identifications with new object identifications for the hierarchy of linked objects; sorting, by the content management system, object dependencies based on the dependencies; retrieving metadata for the hierarchy of linked objects; creating, in the backend server application, a copy of the hierarchy of linked objects using the metadata and the identification map, wherein the copy of the hierarchy of linked objects comprise the new object identifications.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of copying data between computer systems comprising:

storing data in a first computer system, the data comprising a hierarchy of linked objects;

receiving an input triggering an import of the data from a first computer system to a second computer system;

iterating, by the second computer system, through the data to produce a dependencies map, on the second computer system, specifying the hierarchy of linked objects;

generating, by the second computer system, a list of new object identifications for the hierarchy of linked objects before the data is copied; and copying the data from the first computer system to the second computer system, wherein a unique copy of the hierarchy of linked objects is recreated on the second computer system using the dependencies map, wherein the dependencies map comprises an identification map linking old object identifications with new object identifications for the hierarchy of linked objects, and wherein the identification map links a story comprising a plurality of data visualizations with a plurality of data models, and further links each data model of the plurality of data models to a plurality of dimensions.

2. The method of claim 1, wherein the input triggering the import is received in the first computer system, the method further comprising:

after receiving the input, accessing a portion of metadata for the hierarchy of linked objects by the first computer system, the portion of metadata specifying object identifications and dependencies between the linked objects; and sending the portion of metadata to the second computer system.

3. The method of claim 1, wherein the first computer system is a content management system and the second computer system is a backend server application.

4. The method of claim 1, further comprising sorting the dependencies map, wherein said copying is based on the sorted dependencies map so that dependent child objects are copied to the second computer system before parent objects in the hierarchy.

5. The method of claim 1, wherein the plurality of data models is a plurality of predefined data cubes.

6. The method of claim 1, wherein the second computer system comprises a plurality of old versions of one or more objects of the plurality of objects having first object identifications, and wherein, in response to said copying the data, the second computer system creates new objects with new object identifications based on the identification map.

7. The method of claim 1, wherein the first computer system accesses the second computer system using application programming interfaces.

8. A computer system comprising:

at least one processor;

at least one non-transitory computer readable medium storing computer executable instructions that, when executed by the at least one processor, cause the computer system to perform a method of moving of data comprising:

storing data in a first computer system, the data comprising a hierarchy of linked objects;

receiving an input triggering an import of the data from a first computer system to a second computer system;

iterating, by the second computer system, through the data to produce a dependencies map, on the second computer system, specifying the hierarchy of linked objects; and generating, by the second computer system, a list of new object identifications for the hierarchy of linked objects before the data is copied; and copying the data from the first computer system to the second computer system, wherein a unique copy of the hierarchy of linked objects is recreated on the second computer system using the dependencies map, wherein the dependencies map comprises an identification map linking old object identifications with new object identifications for the hierarchy of linked objects, and wherein the identification map links a story comprising a plurality of data visualizations with a plurality of data models, and further links each data model of the plurality of data models to a plurality of dimensions.

9. The computer system of claim 8, wherein the input triggering the import is received in the first computer system, the method further comprising:

after receiving the input, accessing a portion of metadata for the hierarchy of linked objects by the first computer system, the portion of metadata specifying object identifications and dependencies between the linked objects; and sending the portion of metadata to the second computer system.

10. The computer system of claim 8, wherein the first computer system is a content management system and the second computer system is a backend server application.

11. The computer system of claim 8, further comprising sorting the dependencies map, wherein said copying is based on the sorted dependencies map so that dependent child objects are copied to the second computer system before parent objects in the hierarchy.

12. The computer system of claim 8, wherein the plurality of data models is a plurality of predefined data cubes.

13. The computer system of claim 8, wherein the second computer system comprises a plurality of old versions of one or more objects of the plurality of objects having first object identifications, and wherein, in response to said copying the data, the second computer system creates new objects with new object identifications based on the identification map.

14. A non-transitory computer-readable medium storing computer-executable instructions that, when executed by at least one processor, perform a method of copying data from a content management system to a backend server application, the method comprising:

storing data in a content management system, the data comprising a hierarchy of linked objects, wherein a top level object of the hierarchy is a data visualization object, second level objects of the hierarchy are predefined data cubes objects, and third level objects of the hierarchy are dimensions objects;

receiving, in the content management system, an input triggering an import of the data from the content management system to the backend server application;

retrieving, by the content management system, a list of object identifications associated with the hierarchy of linked objects, wherein the object identifications link objects in the hierarchy;

sending the data and the list of object identifications to the backend server application;

iterating, by the backend server application, through the data to produce an identification map linking old object identifications with new object identifications for the hierarchy of linked objects;

sorting, by the content management system, object dependencies based on the identification map;

retrieving metadata for the hierarchy of linked objects; and creating, in the backend server application, a copy of the hierarchy of linked objects using the metadata and the identification map, wherein the copy of the hierarchy of linked objects comprise the new object identifications.

* * * * *